Figure 2:
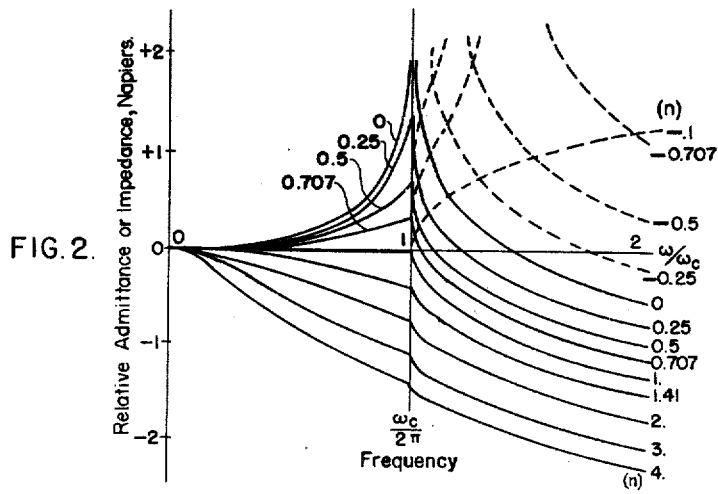

July 25, 1939.  H. A. WHEELER  2,167,135
WIDE BAND COUPLING SYSTEM
Filed April 22, 1938   3 Sheets-Sheet 1

INVENTOR
HAROLD A. WHEELER
BY Laurence B. Dodds
ATTORNEY

July 25, 1939.  H. A. WHEELER  2,167,135

WIDE BAND COUPLING SYSTEM

Filed April 22, 1938   3 Sheets-Sheet 2

INVENTOR
HAROLD A. WHEELER
BY Laurence B Dodds
ATTORNEY

July 25, 1939.   H. A. WHEELER   2,167,135
WIDE BAND COUPLING SYSTEM
Filed April 22, 1938   3 Sheets-Sheet 3

INVENTOR
HAROLD A. WHEELER
BY Laurence B. Dodds
ATTORNEY

Patented July 25, 1939

2,167,135

UNITED STATES PATENT OFFICE 2,167,135

WIDE BAND COUPLING SYSTEM

Harold A. Wheeler, Great Neck, N. Y., assignor to Hazeltine Corporation, a corporation of Delaware Application April 22, 1938, Serial No. 203,596

14 Claims. (Cl. 178—44)

This invention relates generally to wide band coupling systems and particularly to such coupling systems including one or more pairs of terminals, in series with one or more pairs of which there is effectively included substantial inductance and between the said one or more pairs of which it is desired to build up a high admittance which is substantially constant over a wide range of frequencies.

In many coupling systems it is desirable to build up between a pair of terminals thereof a substantially uniform admittance having the largest possible mean value over a wide range of frequencies. For example, in the design of a coupling system for coupling a generator having appreciable series inductance to a current-responsive load, it is desirable to build up through the inductance of the circuits to be coupled the maximum admittance which can be maintained substantially uniform over the operating frequency range of the system. Prior art coupling arrangements designed for this purpose have fallen far short of the desired results.

It is an object of the present invention, therefore, to provide a wide band coupling system comprising one or more pairs of terminals, at least one pair having associated therewith substantial series inductance and between which a maximum mean value of admittance is maintained over a wide frequency range.

It is another object of the invention to provide a coupling system having maximum transfer admittance over a wide frequency range for use between a voltage-regulated generator and any kind of a load circuit, or between any kind of a generator and a current-responsive load.

In accordance with the invention, a signal-translating system for operation over a wide range of frequencies comprises one or more pairs of terminals in series, with one pair of which there is substantial reactance tending to limit the response of the system over its range. A dead-end filter is provided having a predetermined image impedance over the range coupled to the one of the pairs of terminals, the filter comprising only a part of the reactance associated with the said pair of terminals as a terminal mid-series element and having an impedance termination coupled to the dead end of the filter proportioned substantially to match the image impedance of the filter over the range. The reactive constants of the dead-end filter are so proportioned relative to the reactance associated with the said pair of terminals and the operating frequency range that the mean value of the admittance between the said pair of terminals over the range is substantially the maximum value that can be maintained therebetween over the range. Other modifications of the dead-end filter of the invention are described and claimed in applicant's copending applications Serial No. 203,595, Serial No. 203,597, and Serial No. 203,598, filed concurrently with the present application while a general circuit arrangement for maintaining uniform impedance over the wide range of frequencies across a pair of terminals having associated therewith inherent inductance tending to limit the response of the system is described and broadly claimed in applicant's related copending application Serial No. 161,017, filed August 26, 1937, all assigned to the same assignee as the present application.

Figure 1:
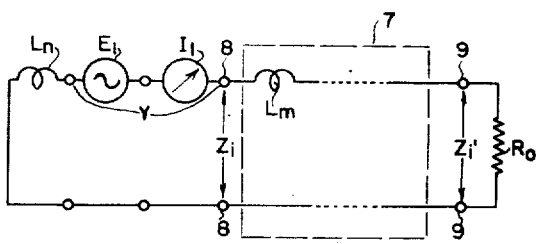
Figure 3:
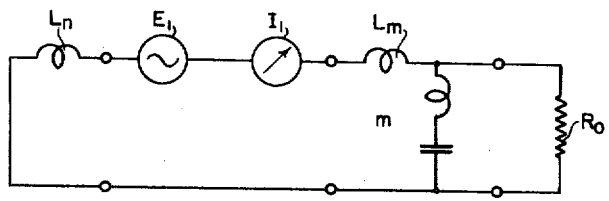
Figure 4:
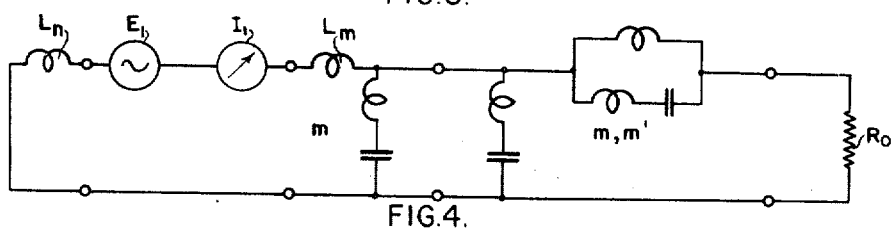
Figure 5:
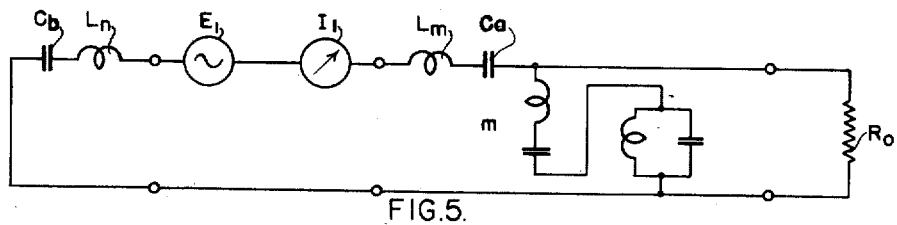

The novel features believed to be characteristic of the invention are set forth with particularity in the appended claims. The invention itself, however, both as to its organization and method of operation, together with further objects and advantages thereof, will best be understood by reference to the specification taken in connection with the accompanying drawings, in which Fig. 1 is a simplified or equivalent circuit diagram of a coupling network embodying the invention and is utilized to explain the theory of the invention; Fig. 2 is a graph illustrating certain of the operating characteristics of the circuit of Fig. 1; Figs. 3, 4, and 5 are circuit diagrams illustrating different embodiments of two-terminal networks utilizing the invention; Figs. 6a–8c, inclusive, are circuit diagrams utilized to explain different embodiments of four-terminal networks utilizing the invention; while Figs. 9–11, inclusive, illustrate different embodiments of a four-terminal network utilizing the invention.

The principles and theoretical relations underlying the invention are described most simply by reference to a non-dissipative wave filter of the constant-k type. This filter may be assumed to have an infinite number of sections or to be terminated with its image impedance to give the same effect. The input impedance of such a filter is uniform over its pass bands if the input termination is full-series or full-shunt as distinguished from the usual mid-series or mid-shunt termination. The input impedance is the iterative impedance measured outside of a full-series or full-shunt arm as distinguished from the conventional image impedance considered at mid-series or mid-shunt. This input impedance may be regarded as a two-terminal coupling impedance, the remainder of the filter serving merely as a dead-end supplementary network utilized to build up the desired uniform impedance between the two terminals. Any such filter of finite total band width can be arranged to include directly in series with its full-series arm an inductance of the value $$L = 2R'/\Delta\omega \qquad (1)$$

The uniform full-series iterative impedance through inductance L then has a magnitude $$R' = L\Delta\omega/2 \qquad (2)$$

This relationship expresses the theoretical minimum value of impedance, or, reciprocally, the maximum value of admittance, that can be maintained through an inductance L over pass bands of total width $\Delta\omega$. In the case of a simple low-pass filter, this minimum value of impedance is half the reactance of inductance L at the cutoff frequency.

The problem reciprocal to building up the admittance through an inductance is building up the impedance across capacitance. A filter can be arranged to include directly in series with all the other elements of its series arm a capacitance of the value C which is equal to $$\frac{2}{R\Delta\omega}$$

in which R is the mid-band image impedance and $\Delta\omega$ is $2\pi$ times the total width of the pass bands. The uniform full-shunt iterative impedance across the capacitance C has the magnitude $$R = \frac{2}{C\Delta\omega}$$

This relationship expresses the theoretically maximum value of admittance that can be maintained across a capacitance C of the frequency bands of total width $\Delta\omega$. In the case of a simple low-pass filter, this value is half the capacitance of C at the cutoff frequency. The specification will not be generalized to include derivations of expressions given to maintain a given value of capacitance across a condenser because all the relations hereinafter given can be applied to this problem by the analogy which appears in the preceding formulae.

The image impedance of a filter of the type under discussion is purely resistive in the pass bands, although not uniform. On the other hand, the uniform iterative impedance has a substantial phase angle which is a lagging phase angle as referring to the voltage across a capacitance or the current through an inductance. The phase characteristic is that of a half-section of a constant-$k$ filter. A more general analysis is given hereinafter with reference to a simple low-pass filter without any loss of generality in the foregoing concepts.

Referring now to the drawings, Fig. 1 shows the basic low-pass filter circuit in a simplified form, the filter, per se, represented schematically at 7, having input terminals 8 and output terminals 9. The input termination $L_m$ of filter 7 is a mid-series element and the input admittance $$Y_i = \frac{1}{Z_i}$$

where $Z_i$ is the input impedance, follows the constant-$k$ characteristic. The output termination of filter 7 is either mid-series or mid-shunt and its image impedance $Z_i'$ preferably follows an $m$-derived characteristic to match closely the output load resistance $R_o$. In developing the theoretical relationships involved, this impedance matching is assumed to be exact in the pass band, since any required degree of approximation is possible by means of multiple $m$-derivations.

For the sake of clarity and generality, the total inductance $L_0$ in series with the input terminals 8 may have any value and is, for theoretical purposes, divided into two parts, $L_m$ comprising the mid-series inductance termination of the filter and $L_n$, the external added inductance, thus, only a part of the total inductance in series with the terminals 8 is included in the filter as a mid-series element. The input admittance $Y_i$ is, therefore, in series with the total inductance $L_0 = L_m + L_n$. This admittance is to be built up with the aid of a dead-end filter acting merely as a passive auxiliary network.

The series inductance $L_m$ in the filter is a mid-series element of a terminal half-section. This half-section may be of the $m$-derived type ($m<1$) or a constant-$k$ type ($m=1$), since either type is available in a form whose mid-series termination presents the desired constant-$k$ image admittance $Y_i$ in series with the input terminals 8. In such a half-section the value of the mid-series inductance is $$L_m = \frac{mR_o}{\omega_o} \qquad (3)$$

in which $\omega_o$ is $2\pi f_o$, where $f_o$ is the cutoff frequency of the low-pass filter. The external series inductance $L_n$ can have any value as determined by the choice of the parameter $n$ in the formula $$L_n = \frac{nR_o}{\omega_o} \qquad (4)$$

Therefore, the total series inductance is $$L_0 = L_m + L_n = (m+n)R_o/\omega_o \qquad (5)$$

The factor $(m+n)$ may have any positive value. One of the parts may be negative, since the parts do not have to exist separately. Negative $L_n$ merely means that the total inductance $L_o$ is less than the mid-series inductance $L_m$ of the filter. Equation 5 may also be written as $$\omega_c = (m+n)R_o/L_o \qquad (6)$$
$$R_o = L_o\omega_c/(m+n) \qquad (7)$$
$$L_o\omega_c/R_o = m+n \qquad (8)$$

The image impedance $Z_i$ depends only on $R_o$ and $\omega_c$, not on $L_n$ and $m$, because it always has the constant-$k$ characteristic $$Z_i = R_o\sqrt{1-\left(\frac{\omega}{\omega_c}\right)^2} \qquad (9)$$

The image impedance is resistive in the pass band, inductive in the attenuation band, and zero at the cutoff frequency.

It is convenient to use the parameter $x = \omega/\omega_c$ in subsequent expressions to denote the ratio of any frequency to the cutoff frequency. The relative admittance $L_n$ and $Z_i$ in series is then:

$$YR_o = \frac{1}{Z_i/R_o + j\omega L_n/R_o} = \frac{1}{\sqrt{1-x^2} + jxn} \qquad (10)$$

This expression has a discontinuity at the cutoff frequency ($x=1$) where the $Z_i$ term of the denominator changes from real to imaginary. It is seen that the form of the admittance characteristic depends only on $$n = L_n\omega_c/R_o \qquad (11)$$

from Equation 4 and does not depend on $$m = L_m\omega_c/R_o \qquad (12)$$

from Equation 3.

In the pass band $(x<1)$, $YR_o$ is complex and its magnitude is $$|YR_o| = \frac{1}{\sqrt{1+x^2(n^2-1)}} \quad (13)$$

If $n=1$, $YR_o$ is constant (unity); for greater values of $n$, it has a value of that of a simple resistance and inductance in series, although the phase angle is not the same. The admittance has a lagging phase angle $$b = \tan^{-1}\frac{nx}{\sqrt{1-x^2}} \quad (14)$$

This is the same as the expression for admittance phase angle of a half-section $m$-derived filter except that the $m$ of the filter is replaced by the parameter $n$ which determines the relative value of $L_m$. If $n=1$, Equation 14 simplifies to $$b = \sin^{-1} x \quad (15)$$

In the attenuation band $(x>1)$, $YR_o$ is imaginary and its magnitude is $$|YR_o| = \frac{1}{\sqrt{x^2-1}+xn} \quad (16)$$

It has a lagging phase angle $b=\pi/2$. These characteristics cannot be realized exactly, because the output image impedance $Z_1'$ cannot match $R_o$ outside the pass band. As the attenuation increases, this failure has less effect on the input admittance. Therefore, any degree of approximation to the theoretical characteristics outside the pass band can be realized with a sufficient number of sections designed to secure adequate attenuation.

Fig. 2 shows the theoretical relative admittance characteristics for various values of the parameter $n$ between $-1$ and $+4$. It is noted that the values $\pm 1$ yield uniform admittance in the pass band. If the filter has a constant-$k$ whole section on the input side so that $m=1$, the values $+1$ and $-1$ for $n$ correspond, respectively, to full-series and full-shunt termination. In the former case, the addition of $L_m$ doubles the mid-series element, while in the latter case it cancels the mid-series element. The sign of the parameter $n$ does not affect the magnitude of the admittance in the pass band, but it does determine the sign of the phase angle.

Since only positive self-reactance elements can be realized in a passive network, the value of $m$ in the end half-section of a filter must be between zero and $+1$. Since $m+n$ must be positive, the value of $n$ must be between $-1$ and $+\infty$. Negative values of $n$ make the admittance infinite at the frequency $$x = \frac{1}{\sqrt{1-n^2}} \quad (17)$$

At higher frequencies, the phase angle is reversed in sign, $b=-\pi/2$.

For given values of admittance and band width, any of the admittance characteristics of Fig. 2 are theoretically obtainable in series with the maximum possible value of total inductance if a circuit is chosen which has $m=1$, $n$ having the value identified with the characteristic curve. If $m$ is less than one, the total inductance tolerable directly in series with the input terminals is less by the amount added indirectly in series with the input terminals through the other arms of the filter. Therefore, a uniform admittance equal to $1/R_o$ in the pass band is obtainable across a maximum total inductance directly and indirectly in series, whose value is computed by letting $m=n=1$:

$$L_o = \frac{2R_o}{\omega_c} \quad (18)$$

which corresponds to Equation 1. Any change of the total inductance, by changing the value of $n$, causes an inverse change in the average admittance in the pass band, although the value of $R_o$ remains constant.

In the pass band, the admittance near the cut-off frequency is determined mainly by the value of $n$, that is, by the external series inductance $L_m$. The image impedance $Z_1$ having less effect, the tolerance of mismatching between $Z_1'$ and $R_o$ at the far end of the filter becomes greater. Also, this tolerance increases with $n$. The number of sections in the filter affects the number of peaks and valleys in the actual impedance curve of $Y_1$, while the phase characteristics affect their spacing along the frequency axis.

The general concepts utilized above to develop the expressions relating to low-pass filters are generally valid for filters having any number of pass bands. The mid-series inductance $L_m$ may be supplemented by series elements to form an impedance network of the form required in a constant-$k$ series arm to give the required pass bands. $L_m$ also may be likewise supplemented, so that the inside and outside series arms can still be merged into one. The generalized relation corresponding to Equation 8 is $$L_o \Delta \omega / R_o = m + n \quad (19)$$

in which $\Delta \omega$ is the total width of all pass bands. Uniform admittance of magnitude $1/R_o$ is secured in all the pass bands if $n=1$. It is secured with maximum series inductance if also $m=1$. The expression $L_o \Delta \omega / R_o$, for any condition of uniform admittance may be designated as a "figure of merit", its maximum value being two.

Figs. 3 and 4 illustrate different embodiments of two-terminal low-pass coupling networks utilizing the dead-end filter of the invention. Fig. 3 comprises, in the order named, the external inductance $L_m$ in series with which a generator supplies a voltage of a value $E_1$, resulting in a current of a value $I_1$. The dead-end filter of the invention comprises, in the order named, an $m$-derived half-section, indicated as $m$, of which inductance $L_m$ is a mid-series element, and a terminating resistor $R_o$, the resistance of which matches the image impedance of the dead end of the filter exactly at two points in the pass band and very closely over most of the band. The network of Fig. 4 comprises an external inductance $L_m$ which may be the internal inductance of a generator and in series with which is applied a voltage $E_1$ resulting in a current $I_1$ in the network. The dead-end filter of the invention comprises, in the order named, an $m$-derived half-section indicated as $m$ in the drawings of which inductance $L_m$ is a mid-series element, a double $m$-derived section indicated as $m$, $m'$, and a terminating resistor $R_o$, the resistance of which matches the image impedance of the dead end of the filter exactly at three points in the pass band.

In Fig. 5 there is shown a two-terminal band-pass coupling network utilizing the invention. This network comprises a series-resonant circuit including inductance $L_m$ and capacitance $C_b$ in series with which is supplied a voltage $E_1$, resulting in a current $I_1$ in the system. $C_b$ may be an element of the circuit which may be comprised in the inherent capacitance of the system and tends to limit the response, or it may be an additional added element and is necessary to convert the filter to a band-pass filter. The dead-end filter of the invention comprises, in the order named, an $m$-derived half-section of which the series-connected inductance $L_m$ and capacitance $C_b$ comprise a mid-series arm, and a terminating resistor $R_o$ the resistance of which matches the image impedance of the dead-end filter exactly at four points in the pass band. The circuits of Figs. 4 and 5 above are more complex than that of Fig. 3 and, due to the added elements, provide a more nearly constant response over the pass band.

The low-pass examples of two-terminal networks described above may be utilized to maintain maximum admittance through an inductance element, for example, to secure maximum current from a voltage-regulated generator, such as a moving coil having small internal resistance and appreciable inductance. The inductance may be the total of that of both the input and output circuits of the system.

The dead-end filter of the invention also may be utilized in a four-terminal network and the other of the two two-terminal devices, the generator and the load, may have either shunt capacitance or series inductance. The signal transfer is then limited by the series inductance of one device and either series inductance or shunt capacitance of the other. There are several permutations of such four-terminal networks. In general, each of the terminal devices is limited in performance over a wide frequency band by either shunt susceptance or series reactance. A current-regulated generator or voltage-responsive device have in common the property of small shunt inductance and the limitation is imposed by shunt capacitance. A voltage-regulated generator or a current-responsive load have in common the property of small series resistance and the limitation is imposed by series reactance. The four-terminal networks of the invention employ the principles utilized above for maintaining uniform admittance through series reactance, over a wide band of frequencies, and employ similar principles, described in detail in the above-mentioned application Serial No. 203,295 to maintain uniform impedance across susceptance. The total capacitance and inductance of the circuits to be coupled may be divided into the smallest possible component portions and included in different sections of a filter, so that the impedance or admittance of the filter is limited, not by the total, but by the greatest indivisible portion.

The four-terminal networks of the invention may be analyzed by separating the input and output devices in the filter instead of connecting them directly in series or in parallel. Further benefits may be obtained by further subdivision involving more than two pairs of terminals, the other pairs being within the two essential parts of the filter. For example, the capacitance to ground of connecting leads or of a large grid condenser may be separated from other circuit reactances and may comprise a reactance element of another section of the filter.

Figure 6A:
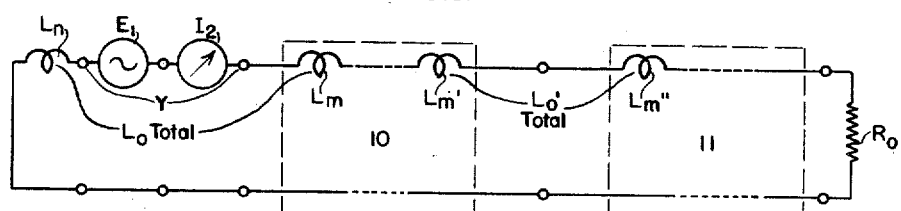

Figs. 6a–8c, inclusive, are the bases of the theoretical analysis of four-terminal networks. They are developed from low-pass filters but exemplify all filters having a finite total band width. The capacitive and inductive arms shown are, respectively, parallel and series arms of low-pass filters. Figs. 6a–6c, inclusive, represent the development of the filter for building up uniform admittance through series inductance. Fig. 6a is essentially a two-terminal network with the total inductance $L_o$ of elements $L_m$ and $L_n$ in series with its terminals. In Fig. 6a, the relationship of Equations 3, 4, and 5 given above apply. The dead-end filter of Fig. 6a is assumed to be non-dissipative. It is shown divided into two parts 10 and 11, which division is a basis for the analysis of the four-terminal networks. The dead-end filter 10, 11 corresponds to filter 7 shown in Fig. 1 and similar elements have been given identical reference numerals. Elements $L_m'$ and $L_m''$ are, respectively, the mid-series inductances of parts 10 and 11 at their adjacent ends. The network 10 is supplied with an input voltage $E_1$ from a voltage-regulated generator which supplies through the filter the output current $I_2$ which is the same as the input current $I_1$ supplied through Y from the generator:

$$I_2 = I_1 = YE_1 \qquad (20)$$

The part 10 of the dead-end filter is "symmetrical" in that it has the constant-$k$ mid-series image impedance at both ends. This does not require symmetry of circuit arrangement within the filter and does not require any constant-$k$ half-sections within the filter, although both of these attributes may be present. The part 11 of the dead-end filter has a constant-$k$ mid-series image impedance at its end coupled to part 10, while at the opposite end it preferably has an $m$-derived image impedance assumed to match the terminal resistance $R_o$ over the pass band. At the junction of parts 10, 11 the mid-series inductance elements have the values:

$$L_m' = m'R_o/\omega_c; \quad L_m'' = m''R_o/\omega_c \qquad (21)$$

$$L_o' = L_m' + L_m'' = (m' + m'')R_o/\omega_c$$

in which $m'$ and $m''$ are the derivation factors of the two parts of the filter. $L_o'$ is the total inductance at the junction, usually a single circuit element.

Figure 6B:
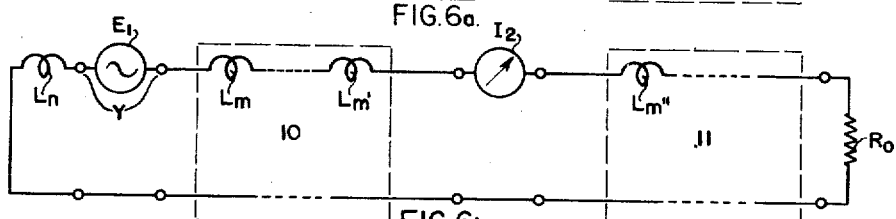

Since the part 10 of the dead-end filter is non-dissipative and has the same image impedance at both ends and since the entire filter is terminated by $R_o$ in such a manner as to prevent reflection, there is developed at the junction of parts 10 and 11 a current equal to that supplied to the input terminals, although displaced in phase. Therefore, the output current can just as well be obtained at the junction as shown in Fig. 6b. It is then determined by the characteristics of both the input admittance Y and transfer admittance of part 10 of the filter:

$$\frac{I_2}{E_1} = \frac{I_1}{E_1} \cdot \frac{I_2}{I_1} = Y\epsilon^{(-a-jb)} \qquad (22)$$

in which $(a+jb)$ represents the attenuation in napiers, and the phase lag in radians in part 10 of the filter. Part 11 is still inactive and functions only as a dead-end network to control the impedance. The attenuation $a$ is assumed to be zero in the pass band.

The phase shift and attenuation obtained by making the part 10 of the filter active between input and output terminals may or may not be desired, but there is a definite advantage in that the limitation on the admittance imposed by the series inductance is cut in half by distributing the input and output inductance between different parts of the filter. In a filter of given admittance and band width, this doubles the total inductance tolerated in series in the input and output circuits. Alternatively, if the total inductance and band width are given, this expedient doubles the transfer admittance that can be maintained uniform over the pass band.

Figure 6C:
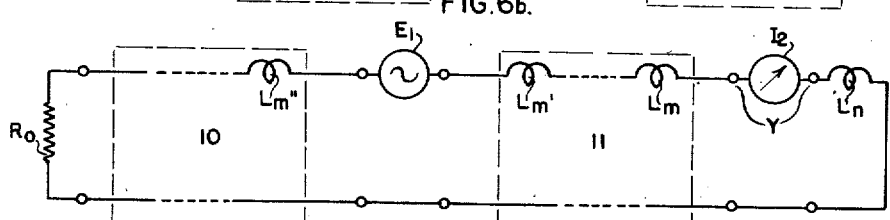

The transfer admittance given by Equation 22 is a reciprocal property of a four-terminal network. Therefore, the network of Fig. 6b can be reversed as shown in Fig. 6c, while retaining its transfer characteristics unchanged. The dead end of the filter is changed from the output side to the input side.

Figure 7A:
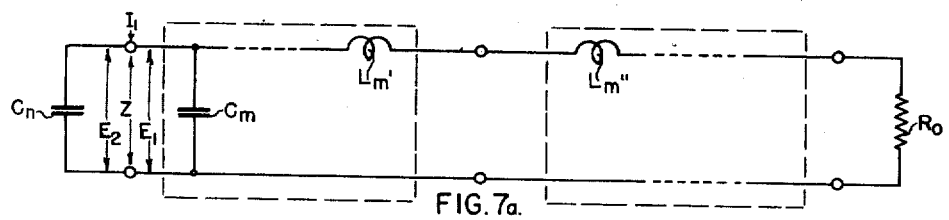
Figure 7B:
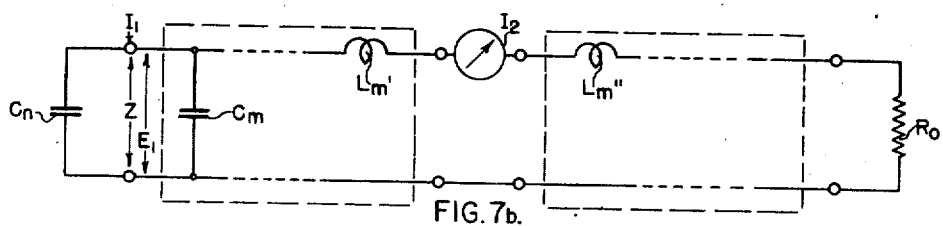

Figs. 7a–8c, inclusive, show the development of coupling networks in which the input and output circuits have reciprocal properties, that is, shunt susceptance and series reactance, or vice versa. The active part of each filter has "reciprocal symmetry" of image characteristics; that is, it has mid-shunt image impedance at one end and mid-series image admittance at the other, both being of the constant-$k$ form. Since they are reciprocal, the quotient of output current and input voltage, or of output voltage and input current, is constant in the pass band, although subject to phase shift. The constant value of the quotient is the mid-band image impedance $R_o$ or its reciprocal $G_o$. These relationships follow from the conservation of power as the waves travel through the filter. In Fig. 7, the essential property of the four-terminal network is its transfer ratio, $$\frac{I_2}{I_1} = \frac{E_1}{I_1} \cdot \frac{I_2}{E_1} = \frac{Z}{Z_0} \epsilon^{(-\alpha-j\beta)} \qquad (23)$$

Figure 7C:
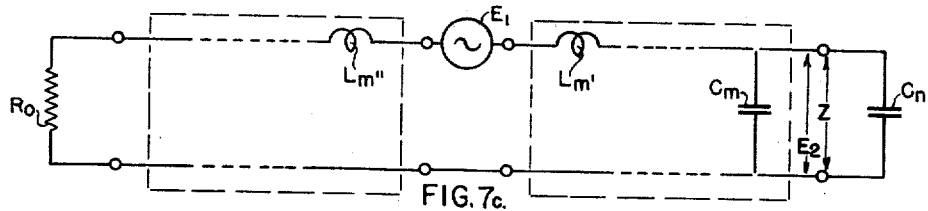

The same transfer ratio is retained in Fig. 7c in which the order of components is reversed:

$$\frac{E_2}{E_1} = \frac{I_2}{E_1} \cdot \frac{I_1}{E_1} = \frac{Z}{Z_0} \epsilon^{(-\alpha-j\beta)} \qquad (24)$$

Figure 8A:
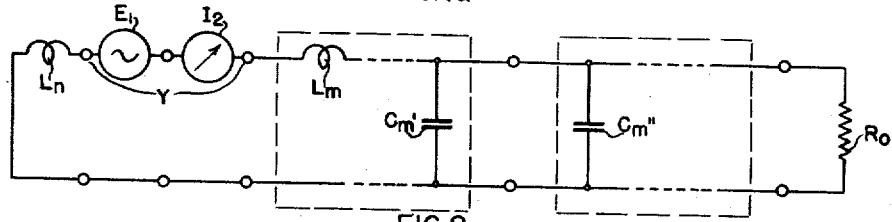
Figure 8B:
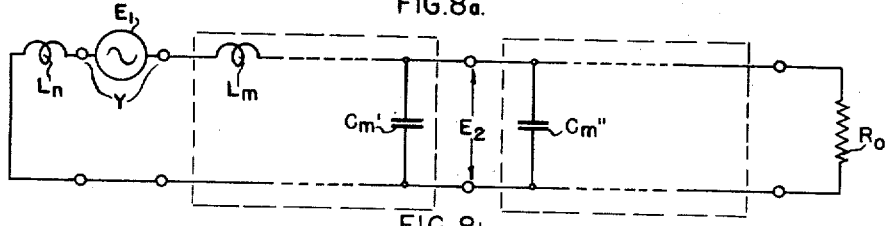
Figure 8C:
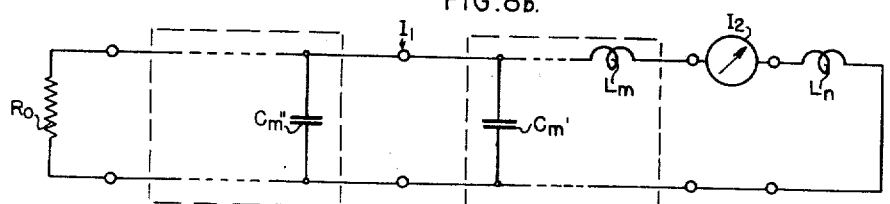

In Fig. 8b, the essential property of the filter is its transfer ratio, $$\frac{E_2}{E_1} = \frac{I_1}{E_1} \cdot \frac{E_2}{I_1} = \frac{Y}{Y_0} \epsilon^{(-\alpha-j\beta)} \qquad (25)$$

which is retained in Fig. 8c:

$$\frac{I_2}{I_1} = \frac{E_2}{I_1} \cdot \frac{I_2}{E_2} = \frac{Y}{Y_0} \epsilon^{(-\alpha-j\beta)} \qquad (26)$$

In any of the low-pass filter examples, the susceptance may be the shunt capacitance of a current-regulated generator or a voltage-responsive load, while the inductance is the series inductance of a voltage-regulated generator of a current-responsive load.

Figure 9:
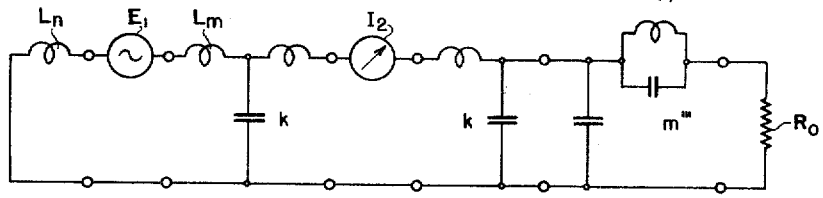
Figure 10:
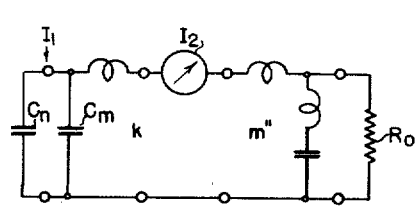

Each of Figs. 9 and 10 shows a practical arrangement embodying the above principles in a low-pass four-terminal network. The terminal circuits are indicated in the drawings by $E_1$ or $I_1$ and $E_2$ or $I_2$. Thus, Fig. 9 shows a four-terminal network comprising, in the following order, an external inductance $L_n$, a constant-$k$ section indicated as $k$ in the drawings comprising inductance $L_m$ as a mid-series element thereof, a constant-$k$ half-section also indicated as $k$ in the drawings, an $m$-derived section indicated as $m'''$ in the drawings, and a terminating resistor $R_o$ which matches the image impedance of the dead end of the filter over the pass band. It will be seen that the circuit of Fig. 9 may thus comprise a generator having appreciable inherent inductance $(L_n+L_m)$ and in inductive load (the inductance of which may be as large as the inductances of the filter circuit of Fig. 9 which are in series with the load current $I_2$). The inductance of the load and that of the generator are separated by shunt susceptance.

The filter of Fig. 10 comprises, in the following order, the external capacitance $C_n$, a constant-$k$ half-section of which capacitance $C_m$ is the mid-shunt element, an $m$-derived half-section indicated as $m''$, and a terminating resistor $R_o$ which matches the image impedance of the dead end of the filter over the pass band. The circuit of Fig. 10 may be utilized to couple a capacitive generator (the capacitance of which is represented by $C_n$ and $C_m$) to an inductance load (the inductance of which is represented by the inductors in series with the load circuit $I_2$).

Figure 11:
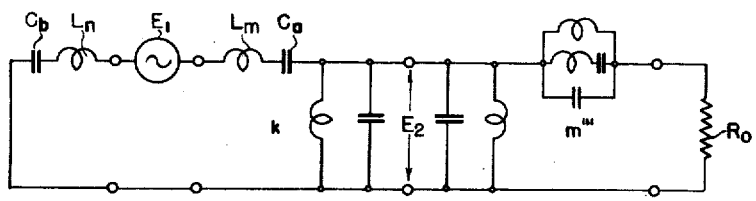

The band-pass filter of Fig. 11 comprises, in the following order, series-connected external elements $C_b$ $L_n$, a constant-$k$ half-section of which $C_a$ and $L_m$ comprise the mid-series arm, an $m$-derived half-section indicated as $m'''$, and a terminating resistor $R_o$ which matches the image impedance of the dead end of the filter over the pass band.

As illustrative of the practical applications of the above-described networks, the following list includes various types of wide band networks and some of the uses to which they are adapted. The dead-end filter of the invention may be on the input or the output side. In this list shunt capacitance is denoted by $(C)$; series inductance is denoted by $(L)$; and the combination of both in series or parallel is denoted as $(CL)$. Each of these elements may be included in the filter design.

TELEVISION

Video-signal translator (band-pass)

Amplifier anode $(C)$ to shielded line to low-impedance antenna $(CL)$, the limiting factor being series reactance.

Low-impedance antenna $(CL)$, the limiting factor being series reactance, to shielded line to amplifier grid $(C)$.

Scanning (low-pass)

Amplifier anode $(C)$ to deflecting coils $(CL)$, the limiting factor being series reactance.

Scanning (band-pass)

Amplifier anode $(C)$ to transformer $(CL)$ to deflecting coils $(CL)$, the limiting factor being series reactance.

SOUND

Audio frequency (band-pass)

Moving coil $(L)$ microphone or phonograph pick-up to transformer $(CL)$ to amplifier grid $(C)$.

Amplifier anode $(C)$ to transformer $(CL)$ to moving coil $(L)$ loud-speaker or receiver.

Condenser $(C)$ microphone or phonograph pick-up to transformer $(CL)$ to amplifier grid $(C)$.

Amplifier anode $(C)$ to transformer $(CL)$ to condenser $(C)$ loud-speaker or receiver, the limiting factor being series reactance.

The low-pass networks here shown are, as mentioned above, illustrative also of networks generally having pass bands of finite total band width. The four-terminal devices are illustrative of networks having any number of input circuits or of output circuits, each with a pair of terminals, disposed along the filter in the manner of the second device inserted between the active and inactive parts of the dead-end filter in Figs. 6a–8c, inclusive.

In the design of the dead-end filters of the invention the preferred value of $m$ in the $m$-derived sections is of the order of 0.6. Values of $m$ between the limits of 0.5 to 0.7 result in a matching of the image impedance of the $m$-derived filter section with the terminating resistor $R_o$ at two points in a low-pass band, or four points in a band-pass filter. Filters having an $m$-derived termination with a value of $m$ greater than 0.7 cannot match the terminal resistor $R_o$ at more than one point in a low-pass band, or two points in a band-pass filter. Each additional m-derivation included in the filter termination makes it possible to match the image impedance with the terminal resistor at one additional point in a low-pass band, or two additional points in a band-pass filter.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A signal-translating system for operation over a wide range of frequencies comprising one or more pairs of terminals in series with one pair of which there is substantial reactance tending to limit the response of said system over said range, a dead-end filter having a predetermined image impedance over said range coupled to said one of said pairs of terminals, said filter comprising only a part of said reactance as a terminal mid-series element of said filter and an impedance termination coupled to the dead end of said filter proportioned substantially to match the image impedance of said filter over said range, the reactive constants of said dead-end filter being so proportioned relative to said reactance and the operating frequency range that the mean value of the admittance between said one pair of terminals over said range is substantially the maximum value that can be maintained therebetween over said range.

2. A signal-translating system for operation over a wide range of frequencies comprising one or more pairs of terminals in series with one pair of which there is effectively inductance tending to limit the response of said system over said range, a dead-end filter having a predetermined image impedance over said range coupled to said one of said pairs of terminals, said filter comprising only a part of said inductance as a terminal mid-series element of said filter, and an impedance termination coupled to the dead end of said filter proportioned substantially to match the image impedance of said filter over said range, the reactive constants of said dead-end filter being so proportioned relative to said inductance and the operating frequency range that the mean value of the admittance between said one pair of terminals over said range is substantially the maximum that can be maintained therebetween over said range.

3. A signal-translating system for operation over a wide range of frequencies comprising one or more pairs of terminals in series with one pair of which there is effectively capacitance tending to limit the response of said system over said range, a dead-end filter having a predetermined image impedance over said range coupled to said one of said pairs of terminals, said filter comprising only a part of said capacitance as a terminal mid-series element of said filter, and an impedance termination coupled to the dead end of said filter proportioned substantially to match the image impedance of said filter over said range, the reactive constants of said dead-end filter being so proportioned relative to said capacitance and the operating frequency range that the mean value of the admittance between said one pair of terminals over said range is substantially the maximum that can be maintained therebetween over said range.

4. A signal-translating system for operation over a wide range of frequencies comprising two pairs of terminals, each pair of which has in series therebetween substantial reactance tending to limit the response of said system over said range, a dead-end filter having a predetermined image impedance over said range coupled to one of said two pairs of terminals, said filter comprising only a part of the reactance in series with said one of said two pairs of terminals as a mid-series terminal element of said filter and comprising the reactance in series with the other of said two pairs of terminals as a full-series intermediate element of said filter, and an impedance termination coupled to the dead end of said filter proportioned substantially to match the image impedance of said filter over said range, the reactive constants of said dead-end filter being so proportioned relative to said reactances and the operating frequency range that the mean value of admittance between said one of said two pairs of terminals over said range is approximately the maximum that can be maintained therebetween over said range.

5. A signal-translating system for operation over a wide range of frequencies comprising two pairs of terminals, in series with each pair of which there is substantial inductance tending to limit the response of said system over said range, a dead-end filter having a predetermined image impedance over said range coupled to one of said two pairs of terminals, said filter comprising only a part of the inductance in series with said one of said two pairs of terminals as a mid-series terminal element of said filter and comprising the inductance in series with the other of said two pairs of terminals as a full-series intermediate element of said filter, and an impedance termination coupled to the dead end of said filter proportioned substantially to match the image impedance of said filter over said range, the reactive constants of said dead-end filter being so proportioned relative to said inductance and said operating frequency range that the mean value of admittance between said one of said two pairs of terminals over said range is approximately the maximum that can be maintained therebetween over said range.

6. A signal-translating system for operation over a wide range of frequencies comprising two pairs of terminals, across one pair of which there is effectively a substantial capacitance and in series with another pair of which there is effectively a substantial inductance, said inductance and said capacitance tending to limit the response of said system over said range, a dead-end filter having a predetermined image impedance over said range coupled to one of said pairs of terminals and comprising only a part of the capacitance associated with said one of said pairs of terminals as a terminal mid-element of said filter and comprising the inductance associated with the other of said two pairs of terminals as a full element of said filter, and an impedance termination coupled to the dead end of said filter proportioned substantially to match the image impedance of said filter over said range, the reactive constants of said dead-end filter being so proportioned relative to said capacitance and inductance and said operating range that the mean value of impedance between said one of said pairs of terminals is approximately the limiting value that can be maintained therebetween over said range.

7. A signal-translating system for operation over a wide range of frequencies comprising two pairs of terminals in series with each pair of which there is effectively substantial inductance tending to limit the response of said system over said range, a dead-end filter having a predetermined image impedance over said range coupled to one of said pairs of terminals and comprising only a part of the inductance in series therewith as a terminal mid-series element of said filter and comprising the inductance in series with the other of said pairs of terminals as a full-series element of said filter, and an impedance termination for the dead end of said filter proportioned substantially to match the image impedance of said filter over said range, the reactive constants of said dead-end filter being so proportioned with respect to said inductances and said operating range that the mean value of admittance between said one of said pairs of terminals is substantially the maximum that can be maintained between said one of said pairs of terminals over said range.

8. A signal-translating system for operation over a wide range of frequencies including a generator having appreciable inductance and an inductive load coupled to said generator, the inductance of said generator and said load tending to limit the response of said system over said range, a dead-end filter having a predetermined image impedance over said range coupled to said generator and said load, said filter comprising only a part of said inductances as a terminal mid-series element, and an impedance termination coupled to the dead end of said filter proportioned substantially to match the image impedance of said filter over said range, the reactive constants of said dead-end filter being so proportioned relative to said inductances and the operating frequency range that the mean value of transfer admittance between said generator and said load is substantially the maximum that can be maintained over said range.

9. A low-pass signal-translating system for operation over a wide range of frequencies including a generator having appreciable inductance and an inductive load coupled to said generator, the inductance of said generator and said load tending to limit the response of said system over said range, a dead-end filter having a predetermined image impedance over said range coupled to said generator and said load, said filter comprising only a part of said inductances as a terminal mid-series element, a double $m$-derived impedance termination at the dead end of said filter, and a terminating resistor coupled to said $m$-derived termination, said $m$-derived termination being proportioned substantially to match the image impedance of said filter with said resistor over said range and exactly to match the image impedance of said filter with said resistor at three points in said range, the reactive constants of said dead-end filter being so proportioned relative to said inductances and the operating frequency range that the mean value of transfer admittance between said generator and said load is substantially the maximum that can be maintained over said range.

10. A low-pass signal-translating system for operation over a wide range of frequencies including a generator having appreciable inductance and an inductive load coupled to said generator, the inductance of said generator and said load tending to limit the response of said system over said range, a dead-end filter having a predetermined image impedance over said range coupled to said generator and said load, said filter comprising only a part of said inductances as a terminal mid-series element, an $m$-derived image impedance termination at the dead end of said filter, and a terminating resistor coupled to said $m$-derived termination, said $m$-derived termination being proportioned substantially to match the image impedance of said filter with said resistor over said range and exactly to match the image impedance of said filter with said resistor at two points in said range, the reactive constants of said dead-end filter being so proportioned relative to said inductances and the operating frequency range that the mean value of the transfer admittance between said generator and said load is substantially the maximum that can be maintained over said range.

11. A band-pass signal-translating system for operation over a wide range of frequencies including a generator having appreciable inductance and an inductive load coupled to said generator, the inductance of said generator and said load tending to limit the response of said system over said range, a dead-end filter having a predetermined image impedance over said range coupled to said generator and said load, said filter comprising only a part of said inductances as a terminal mid-series element, an impedance termination for said filter comprising one tuned circuit in a series arm and a pair of tuned circuits in a shunt arm, and a terminating resistor for said impedance termination, said impedance termination being proportioned substantially to match the image impedance of said filter with said resistor over said range and exactly to match the image impedance of said filter with said resistor at four points in said range, the reactive constants of said dead-end filter being so proportioned relative to said inductances and the operating frequency range that the mean value of transfer admittance between said generator and said load is substantially the maximum that can be maintained over said range.

12. A signal-translating system for operation over a wide range of frequencies including a generator having appreciable inductance and an inductive load coupled to said generator, the inductances of said generator and said load being separated by shunt capacitance which together tend to limit the response of said system over said range, a dead-end filter having a predetermined image impedance over said range coupled to said generator and said load, said filter comprising only a part of one of said inductances as a terminal mid-series element and said capacitance as a full-shunt element, an impedance termination coupled to the dead end of said filter proportioned substantially to match the image impedance of said filter over said range, the reactive constants of said dead-end filter being so proportioned relative to said one of said inductances, said capacitance, and the operating frequency range that the mean value of admittance through said generator and said load is substantially the maximum that can be maintained over said range.

13. A signal-translating system for operation over a wide range of frequencies including a capacitive generator coupled to an inductive load, the capacitance of said generator and the inductance of said load tending to limit the response of said system over said range, a dead-end filter having a predetermined image impedance over said range coupled to said generator and said load, said filter comprising only a part of said capacitance as a terminal mid-shunt element and said inductance as a full-series element, an $m$-derived impedance termination comprising a series-resonant shunt arm coupled to the dead end of said filter, and a resistor coupled to said impedance termination, said impedance termination being proportioned substantially to match the image impedance of said filter over said range, the reactive constants of said dead-end filter being so proportioned relative to said inductance and said capacitance and the operating frequency range that the impedance across said generator is substantially uniform and substantially the maximum that can be maintained thereacross over said range.

14. A signal-translating system for operation over a wide range of frequencies including a generator having appreciable inductance and a capacitive load coupled to said generator, the inductance of said generator and the capacitance of said load tending to limit the response of said system over said range, a dead-end filter having a predetermined image impedance over said range coupled to said generator and said load, said filter comprising only a part of said inductance as a terminal mid-series element and said capacitance as a full-shunt element, an $m$-derived impedance termination comprising a series-resonant circuit and a parallel-resonant circuit coupled in parallel as a series arm, a terminating resistor coupled to said impedance termination, said impedance termination being proportioned substantially to match the image impedance of said filter with said resistor over said range, the reactive constants of said dead-end filter being so proportioned relative to said inductance and the operating frequency range that the mean value of admittance between the terminals of said generator is substantially the maximum that can be maintained over said range.

HAROLD A. WHEELER.

Certificate of Correction

Patent No. 2,167,135.   July 25, 1939.

HAROLD A. WHEELER

It is hereby certified that errors appear in the printed specification of the above numbered patent requiring correction as follows: Page 2, second column, line 36, strike out Equation 5, and insert instead $L_o = L_m + L_n = (m+n)R_o/\omega_c$; line 44, strike out Equation 6, and insert instead $\omega_c = (m+n)R_o/L_o$; line 45, strike out Equation 7, and insert instead $R_o = L_o\omega_c/(m+n)$; line 47, strike out Equation 8, and insert instead $L_o\omega_c/R_o = m+n$; strike out line 58, and insert instead *It is convenient to use the parameter $x = \omega/\omega_c$*; line 61, after the word "admittance" insert *of*; line 70, strike out Equation 11, and insert instead $n = L_n\omega_c/R_o$; line 74, strike out Equation 12, and insert instead $m = L_n\omega_c/R_o$; page 3, first column, line 5, for "YR$_o$" read $|YR_o|$; and second column, line 29, strike out Equation 19, and insert instead $L_o\Delta\omega/R_o = m+n$; strike out line 34, and insert instead *expression $L_o\Delta\omega/R_o$, for any condition of uniform*; page 5, first column, line 62, for "in" read *an*; and that the said Letters Patent should be read with these corrections therein that the same may conform to the record of the case in the Patent Office.

Signed and sealed this 24th day of October, A. D. 1939.

[SEAL]

HENRY VAN ARSDALE,
*Acting Commissioner of Patents.* end filter having a predetermined image impedance over said range coupled to said generator and said load, said filter comprising only a part of said capacitance as a terminal mid-shunt element and said inductance as a full-series element, an $m$-derived impedance termination comprising a series-resonant shunt arm coupled to the dead end of said filter, and a resistor coupled to said impedance termination, said impedance termination being proportioned substantially to match the image impedance of said filter over said range, the reactive constants of said dead-end filter being so proportioned relative to said inductance and said capacitance and the operating frequency range that the impedance across said generator is substantially uniform and substantially the maximum that can be maintained thereacross over said range.

14. A signal-translating system for operation over a wide range of frequencies including a generator having appreciable inductance and a capacitive load coupled to said generator, the inductance of said generator and the capacitance of said load tending to limit the response of said system over said range, a dead-end filter having a predetermined image impedance over said range coupled to said generator and said load, said filter comprising only a part of said inductance as a terminal mid-series element and said capacitance as a full-shunt element, an $m$-derived impedance termination comprising a series-resonant circuit and a parallel-resonant circuit coupled in parallel as a series arm, a terminating resistor coupled to said impedance termination, said impedance termination being proportioned substantially to match the image impedance of said filter with said resistor over said range, the reactive constants of said dead-end filter being so proportioned relative to said inductance and the operating frequency range that the mean value of admittance between the terminals of said generator is substantially the maximum that can be maintained over said range.

HAROLD A. WHEELER.

Certificate of Correction

Patent No. 2,167,135.  July 25, 1939.

HAROLD A. WHEELER

It is hereby certified that errors appear in the printed specification of the above numbered patent requiring correction as follows: Page 2, second column, line 36, strike out Equation 5, and insert instead $L_o = L_m + L_n = (m+n)R_o/\omega_c$; line 44, strike out Equation 6, and insert instead $\omega_c = (m+n)R_o/L_o$; line 45, strike out Equation 7, and insert instead $R_o = L_o\omega_c/(m+n)$; line 47, strike out Equation 8, and insert instead $L_o\omega_c/R_o = m+n$; strike out line 58, and insert instead *It is convenient to use the parameter* $x = \omega/\omega_c$; line 61, after the word "admittance" insert *of*; line 70, strike out Equation 11, and insert instead $n = L_n\omega_c/R_o$; line 74, strike out Equation 12, and insert instead $m = L_n\omega_c/R_o$; page 3, first column, line 5, for "YR_o" read $|YR_o|$; and second column, line 29, strike out Equation 19, and insert instead $L_o\Delta\omega/R_o = m+n$; strike out line 34, and insert instead *expression* $L_o\Delta\omega/R_o$, *for any condition of uniform*; page 5, first column, line 62, for "in" read *an*; and that the said Letters Patent should be read with these corrections therein that the same may conform to the record of the case in the Patent Office.

Signed and sealed this 24th day of October, A. D. 1939.

[SEAL]

HENRY VAN ARSDALE,
*Acting Commissioner of Patents.*